US008917857B2

(12) United States Patent
Ebling et al.

(10) Patent No.: US 8,917,857 B2
(45) Date of Patent: *Dec. 23, 2014

(54) METHOD AND SYSTEM FOR CALL TO ROLE

(75) Inventors: Maria Rene Ebling, White Plains, NY (US); William Francis Jerome, Baldwin Place, NY (US); Barry Leiba, Cortlandt Manor, NY (US); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,118

(22) Filed: Aug. 16, 2012

(65) Prior Publication Data
US 2012/0307996 A1 Dec. 6, 2012

Related U.S. Application Data

(60) Division of application No. 12/145,429, filed on Jun. 24, 2008, which is a continuation of application No. 11/153,670, filed on Jun. 15, 2005, now abandoned.

(51) Int. Cl.
*H04M 3/00* (2006.01)
*H04M 3/51* (2006.01)
*H04M 3/523* (2006.01)
*H04M 7/00* (2006.01)

(52) U.S. Cl.
CPC ............ *H04M 3/5191* (2013.01); *H04M 7/006* (2013.01); *H04M 2203/552* (2013.01); *H04M 3/523* (2013.01)
USPC ............ 379/265.09; 379/265.02; 379/265.04; 379/265.11

(58) Field of Classification Search
USPC ............. 379/265.02, 265.09, 266.02, 266.03, 379/221.14, 142.07, 265.04, 265.11, 379/265.01, 265.13, 266
See application file for complete search history.

(56) References Cited

U.S. PATENT DOCUMENTS

| 5,937,057 | A | 8/1999 | Bell et al. |
|---|---|---|---|
| 6,058,435 | A | 5/2000 | Sassin et al. |
| 6,233,332 | B1 * | 5/2001 | Anderson et al. ........ 379/265.09 |
| 7,027,586 | B2 | 4/2006 | Bushey et al. |
| 7,035,390 | B2 | 4/2006 | Elliott |
| 7,092,888 | B1 * | 8/2006 | McCarthy et al. ............ 704/277 |
| 2002/0028007 | A1 * | 3/2002 | Gendron et al. ............. 382/128 |
| 2002/0039408 | A1 * | 4/2002 | Hall et al. .................. 379/90.01 |
| 2002/0186828 | A1 | 12/2002 | Bushnell |
| 2003/0007621 | A1 * | 1/2003 | Graves et al. ................. 379/219 |
| 2003/0161448 | A1 | 8/2003 | Parolkar et al. |

(Continued)

*Primary Examiner* — Duc Nguyen
*Assistant Examiner* — Yosef K Laekemariam
(74) *Attorney, Agent, or Firm* — August Law, LLC; George Willinghan

(57) ABSTRACT

Methods and systems are provided for routing incoming customer service requests directly to the most appropriate destination within a call center without requiring customer knowledge of a specific telephone number or extension to call and without requiring the customer to select from a series of menus. The receiving location or inbound call center accepts a voice call from a customer. The incoming voice call includes an associated data stream. This data stream is processed by the inbound call center and is used to route the call to the appropriate destination or customer service representative, for example a specific person, a department, a subsidiary, an individual either working within a facility or working outside the facility, a subcontractor and combinations thereof. Additional functionality is provided by including additional data, e.g. data in addition to routing data, along with voice data.

8 Claims, 2 Drawing Sheets

(56) References Cited

U.S. PATENT DOCUMENTS

2003/0187988 A1  10/2003  Lee et al.
2004/0141508 A1*  7/2004  Schoeneberger et al. ..... 370/401
2006/0153357 A1  7/2006  Acharya et al.
2008/0126476 A1  5/2008  Nicholas et al.

* cited by examiner

METHOD AND SYSTEM FOR CALL TO ROLE

CROSS-REFERENCE TO RELATED APPLICATIONS

The present application is a divisional of co-pending U.S. patent application Ser. No. 12/145,429, filed Jun. 24, 2008, which is a continuation of co-pending U.S. application Ser. No. 11/153,670, filed Jun. 15, 2005. The entire disclosures of those applications are incorporated herein by reference.

FIELD OF THE INVENTION

The present invention is directed to the field of computer networks. More specifically, the present invention is directed to computer telephony, in particular processing inbound call to call center.

BACKGROUND OF THE INVENTION

Various businesses handle a large volume of phone calls from clients or customers. To facilitate the processing of this large volume of phone calls, many businesses utilize technologies such as call centers and automated call routing equipment. In general, each call center contains the equipment and personnel necessary to manage and to process a large volume of inbound or outbound calls. Inbound call centers provide support for incoming sales and for customer service requests. For example, inbound call centers receive calls from customers looking to obtain information about the goods or services that a company sells, to purchase those goods or services, to manage their accounts and to obtain assistance. The same arrangement of equipment in a given call center, however, can be used as either an inbound call center or an outbound call center.

The problems associated with call routing inbound calls increase as the customer service functions are divided and distributed among an increasing number of departments and representatives. Therefore, customers experience increasing difficulty in identifying the correct customer service group— by having to locate a telephone number associated with that group, for example. The difficulty in identifying the proper service group includes identifying the department providing a particular service, e.g. the Radiology Department at the local hospital, or identifying the person that is on duty or that is currently performing a particular function, e.g. the consultant on duty, the officer of the day, the acting manager or the pediatrician on call.

Inbound call centers typically contain an automatic call distributor (ACD) to handle incoming calls and to provide the desired routing. For example, the ACD connects calls to a sales representative, a customer service representative or a help desk operator, among others. The ACD also facilitates automated routing of incoming calls to prompt the caller to select one or more menu choices and to place calls that cannot be answered immediately into a hold queue until the next appropriate agent becomes available. The hold queue provides the caller with music, advertising or periodic barge-in messages updating the caller on the current queue status. Reponses to the menu choices facilitate routing of the call through the call center in the most appropriate way.

The routing and queuing provided by the ACD was historically handled by a live human operator. For example, a customer would call a customer service number and would be connected with the live operator. The caller would describe the nature of the issue or service desired, for example by saying, "I have a question about my bill," or "The item I ordered hasn't arrived yet." The live operator would determine the customer's needs, route the call accordingly and provide verbal assurance to the customer that the call is being handled by providing responses such as, "You need to speak with our sales department. One moment, please, while I connect you."

The use of ACD has provided companies with a more efficient method of handling and distributing incoming customer requests, particularly as the number of these requests grows. In general, ACD systems prompt callers through a multitude of levels of menus. Customer input is provided by selecting numbers, letters and symbols on the customer premises equipment (CPE) in response to recorded prompts from the ACD. Examples of these prompts include "Press 1 for new orders, press 2 to check on the status of an existing order, press 3 for additional options, press the pound sign to repeat these options." These automated systems often require callers to pass through several levels of menu selections, listening to all options and figuring out which one best applies. As the number of options increases, it is increasingly difficult for a customer to keep track of the various options. If a customer progresses through many levels and is inadvertently disconnected, that customer must reconnect and step through all of the menus again. In addition, callers are often not presented with any options for speaking directly with a live operator.

Recent technological advances provide for the use of voice recognition systems to facilitate customer routing and menu selection. These systems, however, do not eliminate the need to progress through various menus levels. In addition, voice recognition systems provide additional problems including an inability to understand all spoken responses. With these limitations, ACD's can create a customer service interface that is slow and frustrating and that produces a negative response in customers, which is not a desired reaction for purposes of customer service.

Therefore, a need exists for systems and methods that provide for automated and efficient routing of incoming customer service requests to call centers in a more customer-friendly environment.

SUMMARY OF THE INVENTION

The present invention is directed to systems and methods that route incoming customer service requests directly to the most appropriate destination without requiring customer knowledge of a specific telephone number or extension to call and without requiring the customer to select from a series of menus or menu prompts. Exemplary systems and methods used in accordance with the present invention provide for automated call routing in accordance with processing criteria that are defined and transmitted independent of an actual customer service call.

In accordance with one embodiment, the receiving location or inbound call center receives processing or routing criteria from a customer that identifies the services that the customer needs from the inbound call center. When that customer initiates an incoming audio communication, e.g. a voice call, the audio communication data are associated with the processing criteria that was previously received at the call center, and the audio communication is routed in accordance with the associated processing criteria. The audio communication is routed to the appropriate destination or customer service representative, for example a specific person, a department, a subsidiary, an individual either working within a facility or working outside the facility, a subcontractor and combinations thereof. Since the service or function desired by the customer placing the incoming call is referred to as a "role", i.e. the role that the customer wants the inbound call center to perform, systems and methods in accordance with the present invention are viewed as allowing a customer or caller to "call to role", placing a voice call and having that call associated with the transmitted data stream that specifies the role desired. The processing criteria identifying this role are transmitted in the data stream. Additional functionality is provided by including additional data, e.g. data in addition to roles, to a call center in the processing criteria. The data stream may be transmitted independently, or in conjunction with the voice stream.

DETAILED DESCRIPTION

Figure 1:
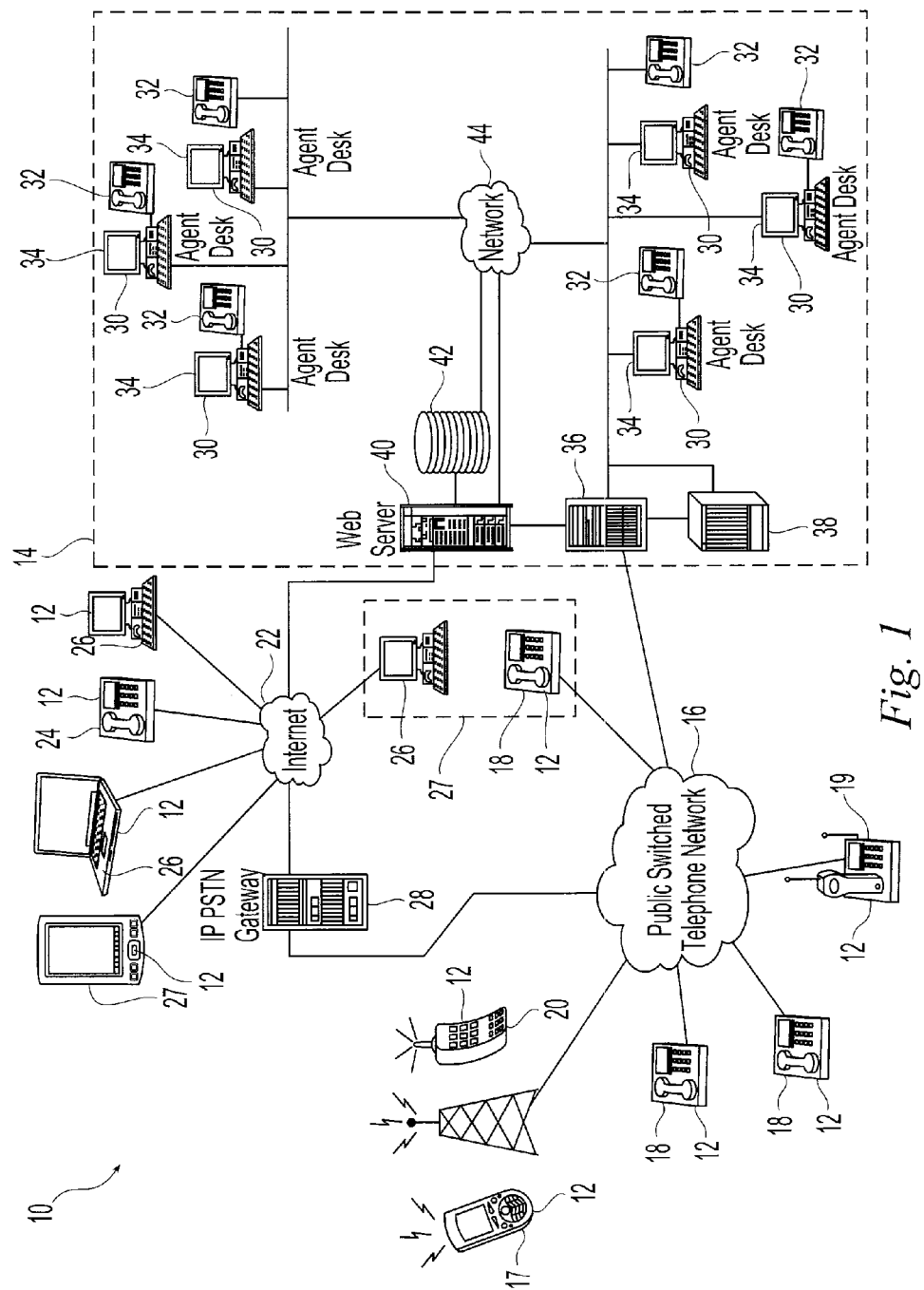
FIG. 1 is an illustration of an embodiment of a system for providing incoming voice calls and associated role data in accordance with the present invention.

Referring initially to FIG. 1, a system 10 for use in accordance with exemplary embodiments of the present invention is illustrated. As illustrated, the system 10 includes one or more callers 12 or customers and a company or call center 14. The callers 12 contact the call center through the public switched telephone network (PSTN) 16 using, for example, conventional wireline phones 18, smart phones 17, cellular phones 20 or wireless phones 19 as the customer premises equipment (CPE). As used herein, smart phones are generally handheld devices that provide for the transmission of text data and voice data in the same device. The ability to send and receive text data provides the smart phone with added functionalities including, but not limited to, the ability to send or receive electronic mail, the ability to conduct instant messaging (IM) sessions, the ability to view internet pages or web sites and the ability to serve as a personal digital assistant (PDA). The callers 12 also contact the call center 14 through the internet 22 using voice over internet protocol (VoIP) enabled phones 24, PDA's 27 or multimedia computer systems 26, including desktop systems and laptop systems as the CPE. The system 10 also includes an internet protocol (IP) PSTN gateway 28 as an interface between the PSTN 16 and the internet 22. Phone calls initiated in the PSTN can be routed through the internet to the call center or can be routed directly through the PSTN to an automatic call distributor (ACD) 36 located in the call center 14.

The call center 14 includes a plurality of agents, operators, specialists, support staff or customer service representatives, referred to generally as customer service representatives or agents 30. Each customer service representative 30 is provided with equipment to handle both the audio portion of an audio communication session or telephone call and the inputting and display of data related to the audio communication. As illustrated, each agent 30 includes a telephone 32 and a computer 34. Although illustrated as separate equipment, the functions of the telephone 32 and computer 34 can be combined into a single piece of equipment. The agents 30 within the call center 14 can be located at a single geographical location or can be located at two or more distinct physical locations. The location and arrangement of the agents 30 are transparent to the callers 12.

The call center 14 includes the ACD 36 to handle and to route the incoming calls through the call center 14. In one embodiment, the call center 14 also includes a private branch exchange (PBX) 38 through which the ACD 36 lines can be routed to provide general carrier interface support for the call center 14. Although illustrated as two distinct pieces of equipment, a combined ACD/PBX can also be used. Direct interface with the PSTN 16 is provided by the ACD 36. Interface with the internet is provided through a web server 40. One or more databases 42 are provided to store information needed by the agents including, but not limited to, technical support information, customer information, parts lists and price lists. Each database 42 can also include the computer-executable code for running methods in accordance with the present invention. Agents 30, the ACD 36, the PBX 38, the web server 40 and the database 42 are in communication across one or more networks 44. Suitable networks 44 include local area networks such as Ethernet networks, wide area networks, secure local and wide area networks, secure wireless networks, enterprise-wide networks, storage area networks, virtual private networks, secure virtual private networks, internet area networks, internet secure networks, personal area networks, and combinations thereof. The telephones 32 located at each agent 30 can be in direct communication with the network 44 or can be in communication with the network 44 through the computer 34.

Figure 2:
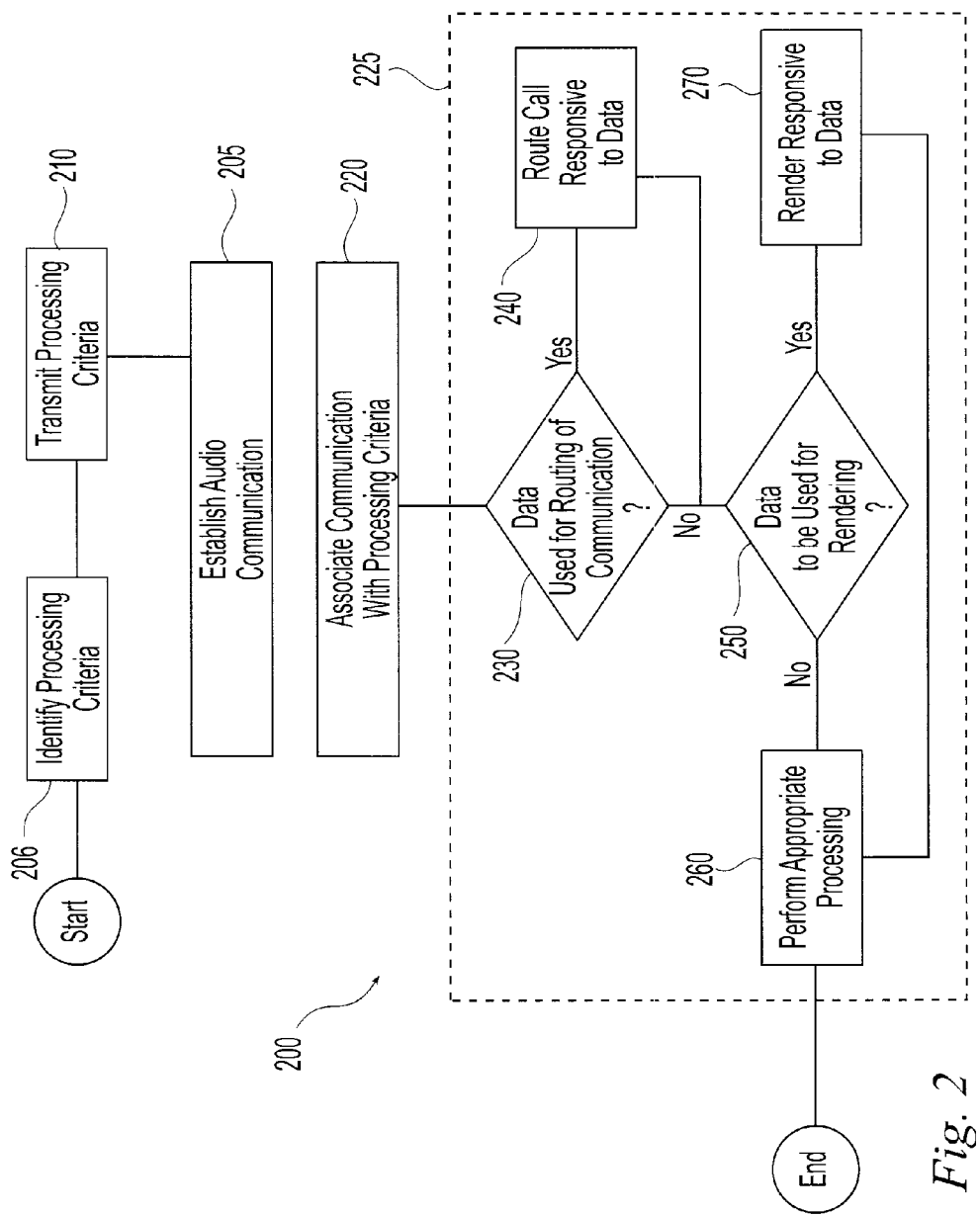
FIG. 2 is a flow illustrating an embodiment of a method for routing incoming calls in accordance with the present invention.

Referring to FIG. 2, an exemplary embodiment of a method 200 for receiving and processing audio communications, for example telephone calls, in accordance with the present invention, is illustrated. In order to provide for the routing of incoming calls in accordance with the desired customer service, process criteria to be applied to an audio communication between an initiating entity and a receiving entity are identified 206. These processing criteria are an expression of the services or roles requested from the receiving entity as well as an identification of the initiating entity and may include but are not limited to customer name, address, phone number, birth date, social security number, customer number, department name, product name, an identification of the service to be performed by the receiving entity, role name, audio communication routing data, security data, authentication data and combinations thereof. Suitable methods for identifying the process criteria include entering user-defined process criteria at the initiating entity. In another embodiment, the processing criteria are defined by selecting at least one processing criterion from a pre-determined list containing a plurality of processing criteria. The pre-determined list containing the processing criteria can be maintained (e.g. by adding new criteria, removing old criteria and modifying existing criteria) by either the initiating entity or the receiving entity. Preferably, the pre-determined list is maintained by the receiving entity.

In one embodiment, the processing criteria are entered or selected by the initiating entity using the input functionality of the equipment or device used to initiate the audio communication. For example, if the initiating entity is using a telephone, then the processing criteria are entered as an alphanumeric string using the keys on the telephone. Alternatively, the processing criteria are entered or selected by the initiating entity using a device that is separate from and independent of any device used to establish the an audio communication. As shown in FIG. 1, a single location 27 can include a wireline phone 18 connected to the PSTN for initiating a telephone call and a separate computer 26 networked to the internet to identify the desired processing criteria.

Any suitable language or syntax that is capable of being read and understood by the receiving entity can be used to identify or construct the processing criteria. Examples of suitable languages include, but are not limited to extensible markup language (XML), computer-readable code, binary code, abbreviations, natural languages, icons, audio signals including Morse code, coded language using, for example, public key infrastructure (PKI), digital signals and combinations thereof.

In one embodiment, processing criteria are identified and entered at the initiating entity as specific keywords, requiring minimal processing at the receiving entity. Alternatively, the processing criteria are free-form, requiring more analysis and processing at the receiving entity.

In one embodiment, the processing criteria are processed as keywords. If the keywords are known to the processing system, for example, if the keywords have been selected from a list provided by the receiving entity, processing constitutes a simple database lookup. If one or more keywords are not known, language-based analysis is applied to relate the unknown keywords to known ones. For example, the unknown keywords "account" and "pay" are mapped to the known keyword "billing".

Alternatively, the processing criteria are processed as free-form text. In one embodiment, language-based analysis is used to process the free-form text. Language based analysis includes identifying keywords in a natural-language sentence or phrase. In the sentence "I have a question about my bill", the keywords "question" and "bill" are identified, and the call is routed to the billing department. In the sentence "The item I ordered hasn't arrived yet", the key words "ordered" and "arrived" are identified, and the call is routed to the shipping department.

Having identified the processing criteria, these processing criteria are transmitted 210 to the receiving entity for evaluation and processing of the audio communication in accordance with the processing criteria. Although the processing criteria can be transmitted to the receiving entity substantially concurrently with the establishment of an audio communication, preferably the processing criteria are transmitted to the receiving entity independent of the establishment of the audio communication and in advance of the establishment of the audio communication. As with identifying the processing criteria, the processing criteria can be transmitted to the receiving entity using a single device that is capable of both transmitting the processing criteria and establishing the audio communication or using separate devices for transmitting the processing criteria and establishing the audio communication.

Having identified and transmitted the desired processing criteria, an audio communication is established 205 between an initiating entity and a receiving entity. Any type of audio communication capable of providing at least one-way and preferably two-way exchanges of audio communication data between two or more entities can be used. Suitable audio communications include synchronous communications, telephone communications including wireline, wireless, cellular, satellite, analogue, digital or voice over internet protocol (VoIP) based telephone communications and combinations thereof. Other suitable audio communications include two-way radio communications and teleconferencing systems including web-based teleconferencing systems. The audio communication can be established across any suitable network or combinations of networks including a public switched telephone network (PSTN), local area networks and wide area networks such as the Internet or World Wide Web. In one embodiment, the audio communication is a telephone call using a PSTN. In another embodiment, the audio communication is a VoIP call using the internet. Suitable control protocols for the VoIP audio communication include session initiation protocol (SIP).

Suitable initiating entities include automated entities and live persons or participants that are capable of initiating the audio communication. These initiating entities include, but are not limited to callers, customers, program participants, buyers, students, patients and combinations thereof. In general, the initiating entity initiates or establishes the audio communication for the purpose of obtaining the desired goods or services from the receiving entity. Although suitable receiving entities include the same types of entities as the initiating entity, typically the receiving entity is a business or institution that provides goods or services. Examples of receiving entities in particular include, but are not limited to, a company selling products, a university providing web-based courses and a government agency providing information to the public.

In one embodiment, each receiving entity includes a plurality of destinations or termination points for the inbound audio communication. These termination points include, but are not limited to, sales, customer service, technical support, registrar, automated support, video conferencing, physician on call, pediatrics, emergency room and account management. In one embodiment, the receiving entity is a call center containing a plurality of destinations. Although typically associated with companies, the concept of a call center can be applied to any collection of destinations including universities, hospitals and government agencies. In addition, the interface or rendering required at the receiving entity for interaction with the initiating entity, including display interfaces, varies with the source, transmission mode and equipment used by the initiating entity. Moreover, additional or ancillary handling may be requested or required by the initiating party including translation services and security functions including authorization and authentication.

Various arrangements of identifying the processing criteria, transmitting the processing criteria and establishing the audio communication are defined by the types of equipment and protocols used to execute these tasks. In one embodiment, the audio communication is a voice over internet protocol (VoIP) telephone call or audio communication. This audio communication is established using a VoIP-enabled device in communication with the internet. In one embodiment the device, for example a laptop computer, a PDA, a camera phone, a smart phone or a game console, establishes an audio communication over a wired or wireless network, and the device stores logical data. These logical data include, but are not limited to, additional personal information, device-specific information and subscriber-specific data. These logical data are transmitted with the communication and the processing criteria information to aid or to enhance the audio communication. In one embodiment the logical data are used in a call center for purposes of handling the call including providing for routing, presentation on the receiving end, and further processing to route the call to subsequent handling.

The desired processing criteria are identified using the networked device, for example in a web-based environment. Therefore, the originating entity can browse or surf the internet and visit a website associated with the receiving entity. Using combinations of hyperlinks, pop-up menus, screens and questionnaires, the desired services are identified and transmitted to the receiving entity. The identification of the processing criteria includes expressing these criteria as an extensible mark-up language (XML) document that is transmitted using suitable protocols. In one embodiment, the suitable protocols include the protocols for the VoIP communication. The use of XML allows robust tagging and structured data. In one embodiment, the processing criteria are transmitted using session initiation protocol (SIP). Suitable methods for forwarding data with VoIP communications are disclosed in U.S. patent application Ser. No. 11/031,927, filed Jan. 8, 2005, which is incorporated herein by reference in its entirety.

In one embodiment, a first device, for example a computer or PDA, is used to view pages of a web-site associated with the receiving entity or business offering the desired services or goods. Within this web-based environment, the first device is used to identify processing criteria, for example the customer's telephone number or the department needed, e.g. accounting, using the web-site's available graphical interface tools. Once identified, the processing criteria are transmitted to the receiving entity across one or more networks. In one embodiment, the processing criteria are transmitted using a pop-up screen in a web-based environment. In response, the receiving entity forwards a telephone number to the originating entity through the web interface, The originating entity uses a second device, separate from the first device, to establish the audio communication between the initiating entity and the receiving entity. In one embodiment, the audio communication is established over the PSTN using CPE such as a conventional telephone as the second device. The forwarded telephone number is used to establish the audio communication. Using the forwarded telephone number provides association between the processing criteria and the audio communication. In another embodiment, upon receipt of the processing criteria, the receiving entity forwards a destination identifier, e.g. an IP address, to the initiating entity. The initiating entity then places an audio call to the destination identifier, e.g. using VoIP.

In one embodiment, a single device is used to identify and to transmit the processing criteria and to establish the audio communication. In one embodiment, the single device comprises a conventional PSTN phone. The keypad on the phone is used to select and transmit alpha-numeric designations of the processing criteria to the receiving entity. The phone is then used to establish the actual audio communication.

In another embodiment, the single device is a smart phone. The text transmitting and receiving functionality of the smart phone is used to identify and transmit the processing criteria, and the telephone functionality is used to establish the audio communication. In one preferred embodiment, the smart phone transmits technical specification data about the smart phone with the processing criteria when a call is placed to the service provider. Smart phones offer a vast array of services and customized downloadable data. This dynamic data, for example the type of service, the type of software on the phone, the type of phone and the identification of any additional software on the phone, is used by the receiving entity or service center to offer new services or to provide updates and patches for services on the smart phone. The ability of the smart phone to have new technologies downloaded makes each smart phone potentially different, and service providers are able to obtain this customized and dynamic information while talking to the smart phone user at the time of the service call.

In one embodiment, a heightened level of security is provided to the smart phone during a call. For example, the smart phone sends a key that is used in conjunction with a voice question posed by the receiving entity to provide a multi-layered security system. This embodiment facilitates multiple security queries, with the result of local action provided to the remote security authority to be used as part of an authentication or authorization. Since the smart phone provides additional security key information, a voice question can be posed that requires a different response for each authorization. Hence, security would not be compromised if the phone is lost or stolen.

Upon establishing the audio communication between the initiating entity and the receiving entity, the previously transmitted routing criteria are associated with the audio communication 220 (FIG. 2). Association of the processing criteria to the correct audio communication is performed at the receiving entity. The processing criteria include a sufficient amount of data or information to provide for the routing and rendering of the audio communication and to provide any ancillary functions associated with the audio communication. The processing criteria are associated with the subsequent telephone call using the calling phone number, the data channel used to make the call or other means suitable to the device and network capabilities. In one embodiment, association between the processing criteria and the audio communication is facilitated by including an identification tag in the transmitted processing criteria. Suitable identification tags include a phone number or uniform resource locator (URL) associated with the initiating entity. The identification tag is used to associate the processing criteria with the audio communication, for example using information provided by typical web browsers or caller identification systems.

Having established the audio communication and associated the desired processing criteria with that audio communication, the audio communication is processed in accordance with the associated processing criteria 225. In general, processing involves evaluating and executing the processing criteria. As illustrated in FIG. 2, a determination is first made about whether or not the processing criteria contain information or data concerning the routing of the audio communication to one or more destinations within the receiving entity 230. If routing data exist, then the audio communication is routed accordingly 240. For example, the processing criteria can include an identification of a destination within the receiving entity, and the audio communication is routed to the identified destination.

If the processing criteria do not include routing data, then the processing criteria are evaluated for data related to the rendering of the audio communication at the receiving party 250. If rendering data are present, the audio communication is rendered accordingly 270. If no rendering data are present, then any additional processing criteria are executed including security functions 260.

If the receiving party is unable to process one or more of the criteria, the audio communication is processed in accordance with predetermined default criteria. For example, if no routing or role information is provided, if the routing information is inaccurate or if the routing information has been corrupted, then the audio communication is routed to a default location, for example a live operator or a typical prompt menu.

Various exemplary embodiments in accordance with the present invention are possible depending on the type of equipment and audio communications used. In general, the system used with exemplary embodiments of the present invention can be divided into three subsystems—an end-user subsystem, a transmission subsystem and a processing subsystem. In one embodiment, a method in accordance with the present invention is used to route an inbound telephone call through a call center. The telephone call is initiated between the caller and the call center, and routing criteria for the telephone call are transmitted from the caller to the call center. In one embodiment, the routing criteria are transmitted by forwarding alpha-numeric designations indicative of the desired routing using equipment disposed at the caller. Alternately, the routing criteria are transmitted independent of the call and are associated with the telephone call at the call center. The telephone call is then routed through the call center in accordance with the routing criteria. In one embodiment, the routing criteria include an identification of at least one destination within the call center, an identification of a role to be performed by the call center and combinations thereof. The routing criteria can be selected from a pre-determined list of routing criteria maintained, for example, by the call center.

In one embodiment, the telephone call is a VoIP based telephone call, and the step of transmitting the routing criteria includes transmitting the routing criteria in an XML document attached to control data calls in the protocol language used for the VoIP telephone call.

In one exemplary embodiment, the initiating entity is a user with a session initiation protocol (SIP) based phone. The user dials a number and keys in an alpha-numeric designation of the role desired from the receiving entity. The text of the alpha-numeric designation is sent as tagged data to the receiving entity. The SIP-based phone establishes an audio communication with the receiving entity. The receiving entity receives both the voice call and the data, and uses the data to route the call in accordance with the desired role. In one embodiment, the receiving entity receives both the voice call and the data and uses the data to route the call at substantially the same time.

In one embodiment, a web browser sends the processing criteria to the receiving entity, and a caller-ID feature at the receiving entity associates the processing criteria with an incoming call placed within a specified period of time. In one embodiment, a cellular phone is used to enter the phone number and, through use of the telephone keypad or a mini-keyboard, to enter keywords indicating the role for which the call is being made. A cellular phone or a fully-featured desktop phone allows the initiating entity to enter the number to be called or to select the number from a pre-programmed directory, either public or private, and then to select one more roles from a pre-determined list of roles. In one embodiment, the list of roles is generic and can be applied to any called number. Alternatively, each list of roles is telephone-number-specific and is stored in the directory entry with the associated phone number.

When a telephone number and list are picked from a public directory, the entity being called maintains the list of roles, allowing the receiving entity to change the list easily and to maintain a single contact telephone number regardless of routing changes internal to the receiving entity call center. Internal routing changes are transparent to the caller. A caller that records separate phone numbers or extensions for "billing" and "shipping" keeps an up-to-date personal directory to handle that. If the caller keeps a single phone number in the personal directory, along with role keywords "billing" and "shipping", then any changes on the receiving side remain strictly on the receiving side and do not affect callers.

The present invention is also directed to a machine-readable or computer-readable medium containing a machine-executable or computer-executable code that when read by a machine or computer causes the machine or computer to perform a method for routing inbound audio communications in accordance with priority criteria transmitted to the entity receiving the audio communication in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for routing an inbound telephone call through a call center, the method comprising:
    entering a natural language phrase by a caller by typing the natural language phrase using a web-based computing environment;
    identifying known keywords in the natural language phrase, the known keywords associated with routing criteria for routing inbound telephone call through the calls center;
    identifying unknown keywords in the natural language phrase;
    mapping the identified unknown keywords to known keywords;
    transmitting the routing criteria associated with the identified known keywords and the keywords to which the unknown keywords are mapped from the caller to a call center independent of the inbound telephone call;
    forwarding a unique telephone number from the call center to the caller in response to the transmitted routing criteria;
    initiating the inbound telephone call between the caller and the call center using the unique telephone number;
    associating the transmitted routing criteria with the initiated inbound telephone call; and
    routing the inbound telephone call through the call center in accordance with the routing criteria.

2. The method of claim 1, wherein the step of transmitting the routing criteria comprises forwarding alpha-numeric designations indicative of the routing criteria using equipment disposed at the caller.

3. The method of claim 1, wherein the routing criteria are transmitted to the call center before initiating the inbound telephone call.

4. The method of claim 1, further comprising identifying at least one routing criterion from a pre-determined list of routing criteria maintained by the call center and displayed in the web-based computing environment.

5. The method of claim 1, wherein the routing criteria comprise an identification of at least one destination within the call center, an identification of a role to be performed by the call center or combinations thereof.

6. The method of claim 1, wherein the step of initiating the telephone call comprises initiating a voice over internet protocol based telephone call and the step of transmitting the routing criteria comprises transmitting the routing criteria in an extensible markup language document.

7. The method of claim 6, further comprising using session initiation protocol to control the telephone call.

8. The method of claim 1, wherein:
    the method further comprises:
        entering identifying information associated with the caller; and
        associating the identifying information with the initiated inbound telephone call.

* * * * *